United States Patent [19]

Wolf et al.

[11] Patent Number: 5,199,389
[45] Date of Patent: Apr. 6, 1993

[54] WORK APPARATUS HAVING AN AIR-COOLED INTERNAL COMBUSTION ENGINE

[75] Inventors: Günter Wolf, Oppenweiler; Reinhold Fink, Fellbach, both of Fed. Rep. of Germany

[73] Assignee: Andreas Stihl, Waiblingen, Fed. Rep. of Germany

[21] Appl. No.: 901,154

[22] Filed: Jun. 19, 1992

[30] Foreign Application Priority Data

Jun. 21, 1991 [DE] Fed. Rep. of Germany ....... 4120877

[51] Int. Cl.[5] .............................................. F01P 1/02
[52] U.S. Cl. .............................. 123/41.7; 123/198 E; 30/381
[58] Field of Search ............ 30/381; 123/41.56, 41.69, 123/41.7, 198 E

[56] References Cited

U.S. PATENT DOCUMENTS

| | | | |
|---|---|---|---|
| 4,413,705 | 11/1983 | Inaga et al. | 30/381 |
| 4,932,366 | 6/1990 | Zerrer | 123/41.58 |
| 4,936,271 | 6/1990 | Nagashima et al. | 30/381 |
| 5,018,492 | 5/1991 | Wolf et al. | 123/198 E |
| 5,029,393 | 7/1991 | Nagashima et al. | 30/381 |

FOREIGN PATENT DOCUMENTS 3713074 10/1987 Fed. Rep. of Germany .

*Primary Examiner*—Noah P. Kamen
*Attorney, Agent, or Firm*—Walter Ottesen

[57] ABSTRACT

The invention in directed to a work apparatus such as a motor-driven chain saw having a housing and an air-cooled internal combustion engine mounted therein. An exhaust-gas muffler is mounted in proximity to the cylinder of the engine. A flow of cooling air for cooling the cylinder is guided transversely through the housing. In order to obtain an efficient cooling, the muffler has an L-shaped housing and is configured to define a conducting wall for guiding the cooling air flow. One leg of the L-shaped housing is disposed approximately parallel to the flow direction of the cooling air on one side of the cylinder while the other housing leg lies transversely to the flow direction thereby causing the air of the air flow to partially back up. In this way, the side of the cylinder facing away from the flow direction is cooled with the cooling air being effective down to the base of the cooling ribs of the cylinder.

12 Claims, 4 Drawing Sheets

WORK APPARATUS HAVING AN AIR-COOLED INTERNAL COMBUSTION ENGINE

FIELD OF THE INVENTION

The invention relates to a work apparatus such as a motor-driven chain saw having a housing and an air-cooled internal combustion engine mounted therein. An exhaust-gas muffler is mounted in proximity to the cylinder of the engine. A flow of cooling air for cooling the cylinder is guided transversely through the housing.

BACKGROUND OF THE INVENTION

In work apparatus such as motor-driven chain saws, cutoff machines or the like driven by an internal combustion engine, the air-cooled engine is disposed in a housing and is cooled by a flow of cooling air. Especially in handheld portable work apparatus, a compact configuration is desired in order to obtain a high level of manipulability. With the compact configuration, the drive and the ancillary components are crowded into a housing as small as possible. This leads to considerable temperature problems because of the engine since, for example, a fuel tank mounted in the housing is placed close to the cylinder or to the exhaust-gas muffler. The crowded configuration can in addition lead to overtemperatures thereby leading to damage at the cylinder. For this reason, an adequately high air throughput for conducting away the heat must be generated by a cooling air fan dimensioned to have the appropriate size. A large-dimensioned cooling air fan not only needs a correspondingly large amount of driving energy, which is then not available at the tool of the work apparatus, but also, the air-cooled fan must be large so that the desired reduced size of the work apparatus itself is not achieved.

SUMMARY OF THE INVENTION

It is an object of the invention to provide a work apparatus wherein overheating of temperature-sensitive components is reliably avoided notwithstanding the crowded configuration.

The work apparatus of the invention is, for example, a motor-driven chain saw and includes: a housing defining a longitudinal axis; the housing having first and second longitudinal sides defining a mounting space therebetween; an air-cooled internal combustion engine having a cylinder extending into the mounting space; a fuel tank arranged in the housing in close proximity to the cylinder; the first longitudinal side defining an air inlet opening for receiving a flow of cooling air flowing in an air flow direction transversely to the axis for cooling the cylinder; the second longitudinal side defining an air outlet opening for passing the flow of cooling air to the ambient; an exhaust gas muffler for receiving exhaust gas from the engine; the exhaust gas muffler having a substantially L-shaped housing defining first and second housing legs; the first and second housing legs conjointly defining a conducting wall for guiding the flow of cooling air; the cylinder having a first side facing toward the first housing leg and a second side facing toward the second housing leg; the first housing leg extending approximately parallel to the air flow direction; and, the second housing leg being arranged transversely to the air flow direction so as to cause air flowing along the conducting wall to partially back up thereby facilitating an increased transfer of heat from the cylinder to the air.

The arrangement of the exhaust-gas muffler housing as a conducting wall for guiding the cooling air ensures on the one hand a close conduction of cooling air on the cylinder and, on the other hand, ensures at the same time that the heat of the exhaust-gas muffler is conducted away. The muffler is mounted so that cooling air passes on all sides thereof. By maintaining a gap, the exhaust-gas muffler can also be mounted near a housing wall made of plastic.

A large muffler volume in the smallest possible space is achieved by means of the L-shaped configuration of the muffler housing so that a high noise attenuation is obtained. The muffler housing includes a leg lying transversely to the primary flow direction at the air-outlet end. This leg effects a wanted congestion or backing up of cooling air so that the cooling air penetrates to the base of the cooling ribs whereby a high conduction of heat away from these hot locations is obtained. The leg of the muffler housing lying transversely to the flow direction also leads to a deflection of the cooling air flow whereby the side of the cylinder facing away from the main flow receives an adequate supply of cooling air.

The configuration of the muffler housing as a guide wall guiding the cooling air effects thereby an optimal utilization of the cooling air supplied so that no increased amount of cooling air is necessary to conduct away the amount of heat notwithstanding the crowded configuration and the components mounted close to each other.

In an especially advantageous embodiment of the invention, an air-conducting plate is mounted between the cylinder and the fuel tank. The air-conducting plate lies at a spacing with respect to the wall of the fuel tank and this wall and the air-conducting plate conjointly define a gap through which air flows. An increased transfer of heat is reliably avoided notwithstanding the position of the fuel tank next to the cylinder and the exhaust-gas muffler. On the one hand, the air-conducting wall itself acts as a large-surface stop for a transfer of heat while, on the other hand, an air stop is formed which continuously experiences an air exchange which reliably prevents a large transfer of heat. This is achieved because of the gap between the air-conducting wall and the wall of the fuel tank through which air flows.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
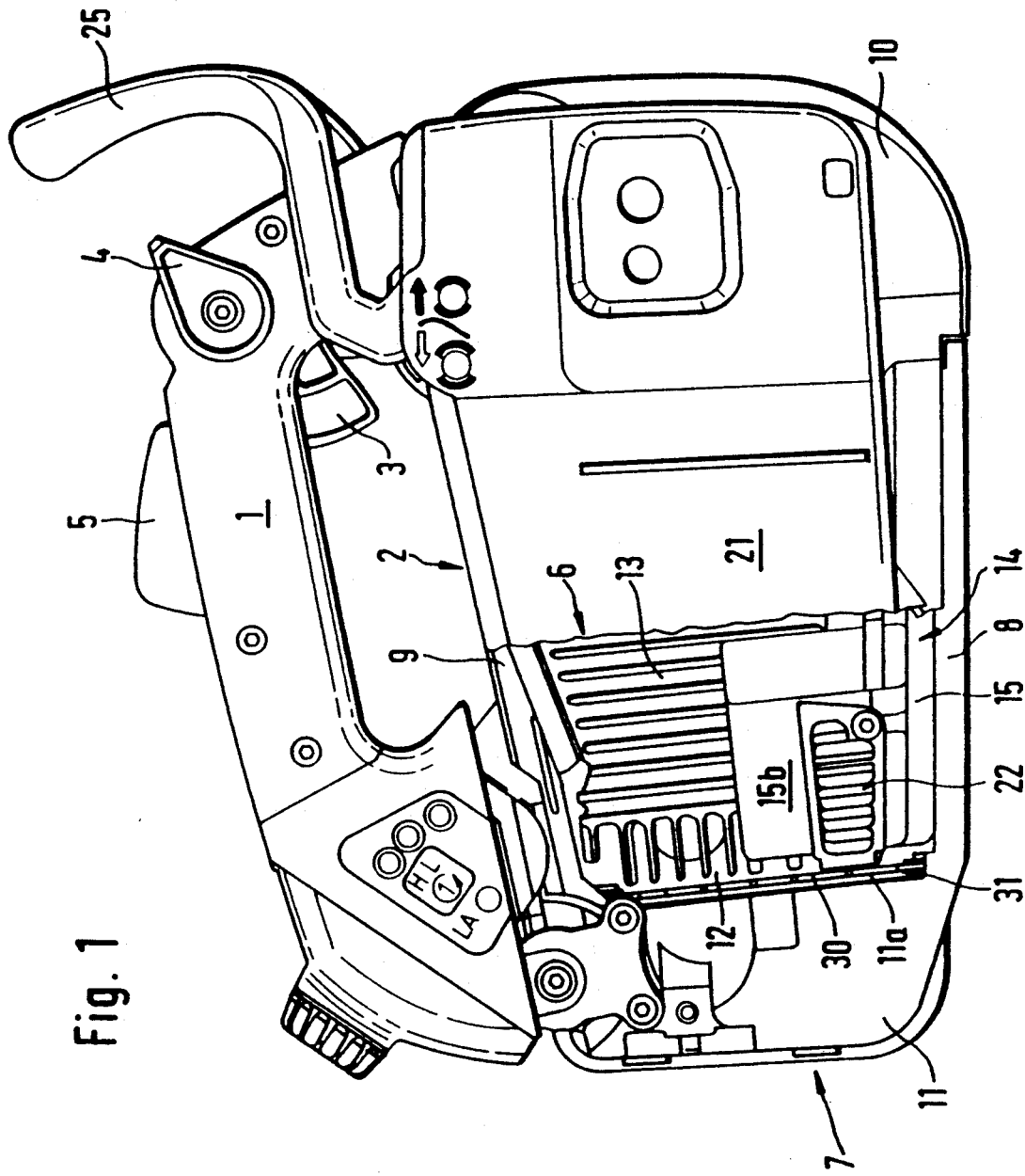
FIG. 1 is a side elevation view of a motor-driven chain saw wherein the sprocket wheel cover has been partially broken away.

The motor-driven chain saw shown in FIG. 1 is a top-handle chain saw wherein a holding handle 1 is mounted on the top side of the housing 2 and directed in the direction of the longitudinal axis of the housing. Operator-actuable elements are mounted in the forward portion of the handle 1 such as a throttle lever 3, throttle-lever lock 5, and a positioning device 4 for the choke flap. On the other hand, a carburetor (not shown) is mounted in the rearward portion of the handle 1 and supplies the engine 6 mounted in the housing 2.

Figure 2:
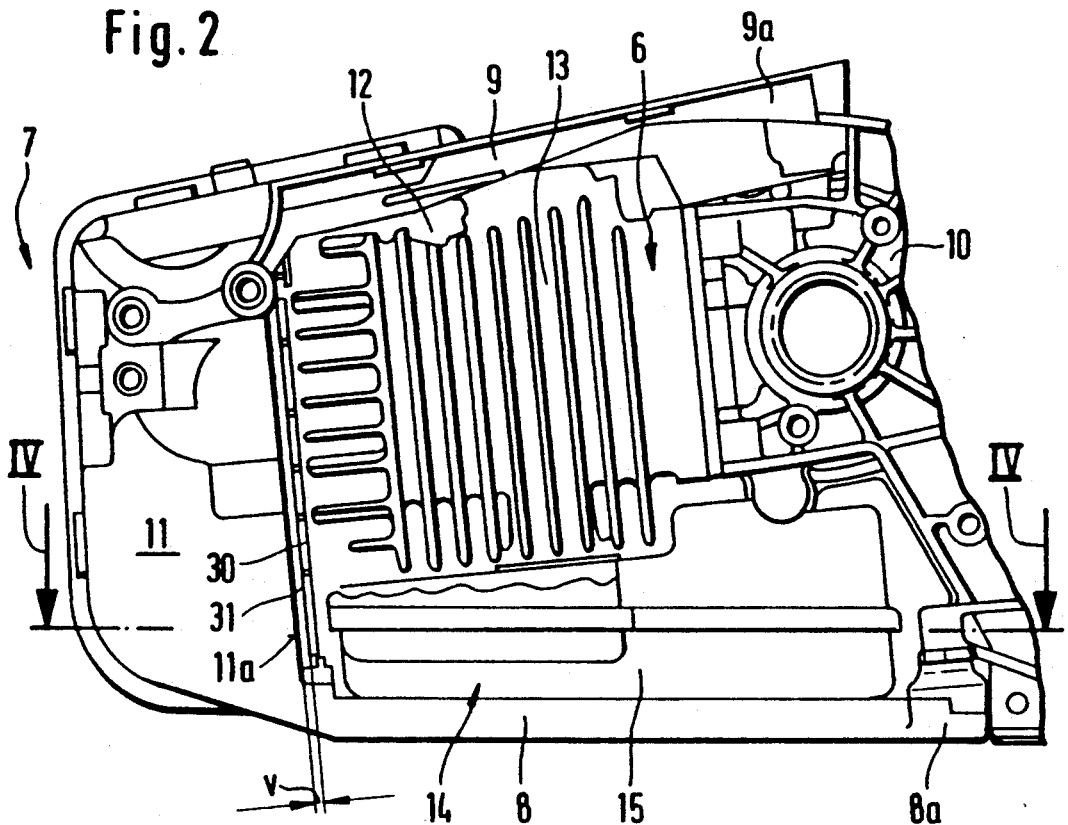
FIG. 2 is an enlarged schematic representation of the arrangement of the engine in the housing of the motor-driven chain saw.
Figure 3:
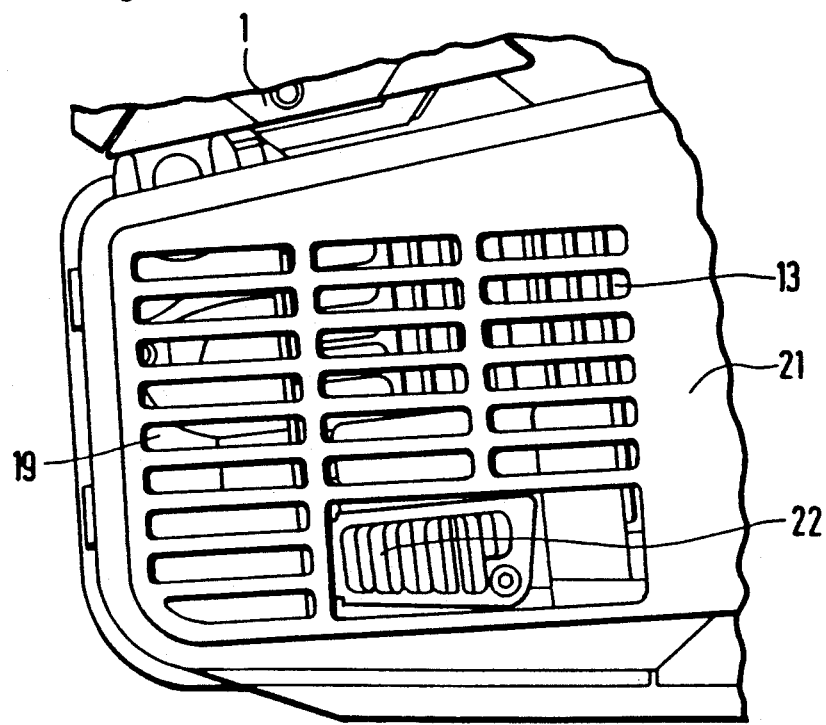
FIG. 3 is a side elevation view of the sprocket wheel cover having an air outlet.

The housing 2 essentially comprises a U-shaped base body 7. The base body 7 has flanges (8, 9) having respective free ends (8a, 9a) which are fixed to the crankcase 10 of the engine as shown in FIG. 2. The member of the U-shaped base body 7 which connects the flanges 8 and 9 is configured as a fuel tank 11 as also shown in the patent application of Günter Wolf, Reinhold Fink and Rudolf Dirks entitled "Portable Handheld Work Apparatus" filed on the same day as this application.

The air-cooled engine is especially a two-stroke engine having a cylinder 13 lying on its side. The cylinder 13 is mounted in the space 12 between the fuel tank 11 and the crankcase 10.

Figure 6:
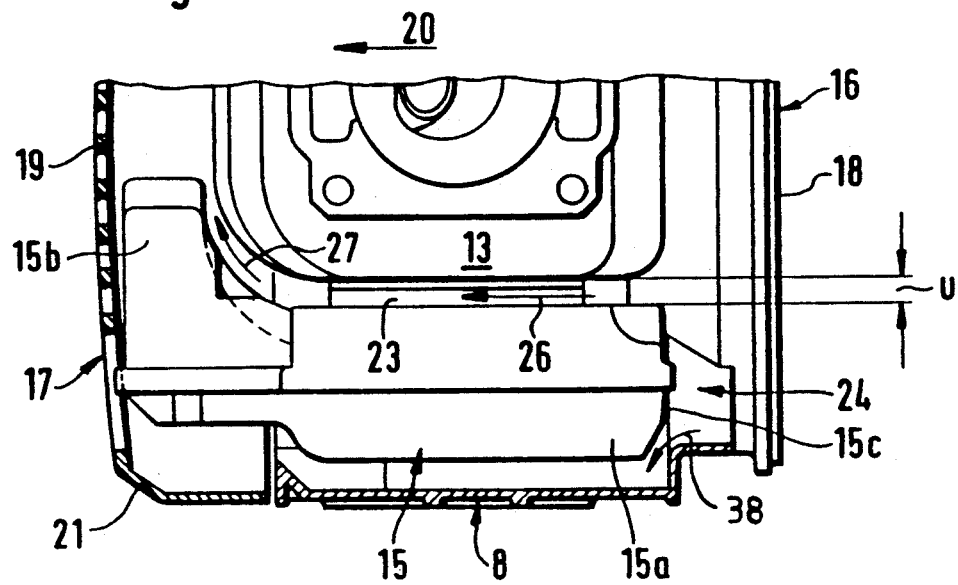

An exhaust-gas muffler 14 lies below the cylinder 13 next to the flange 8 defining the base of the housing 2. The exhaust-gas muffler has a housing 15 which has essentially an L-shaped configuration (FIG. 6). The longer leg 15a of the muffler housing 15 extends from the one longitudinal side 16 of the housing to essentially the other longitudinal side 17 of the housing and has a width which corresponds approximately to the height of the cylinder 13. The shorter leg 15b of the L-shaped muffler housing 15 surrounds the cylinder over a portion of its width and thereby lies transversely to the primary flow direction 20 of the cooling air which flows in at the one longitudinal side 16 of the housing via a cooling air inlet 18 and, after flowing around the cylinder 13, passes through an air outlet 19 on the other longitudinal side 17 of the housing 2. The air-inlet opening 18 is defined by the intake opening of a cooling air fan; whereas, the air outlet 19 is configured as a grid in the sprocket wheel cover 21.

The muffler outlet 22 is mounted on the side of the shorter leg 15b with this side facing toward the sprocket wheel cover 21. The muffler outlet 22 lies next to the air outlet 19 and is advantageously integrated into the air-outlet grid. A safety brake device is integrated into the sprocket wheel cover 21. A trigger 25 of the safety brake device is journalled on the sprocket wheel cover 21 and extends transversely forward of the handle 1.

As shown in FIG. 6, the longer leg 15a of the muffler housing 15 lies parallel to the primary flow direction 20 of the cooling air and is at a spacing (u) to the cylinder 13. In this way, the cylinder and the muffler housing 15 conjointly define a gap 23 for conducting the cooling air.

The transition between the legs 15a and 15b of the muffler housing 15 are configured so as to be rounded at the side thereof facing toward the cylinder 13. In this way, a continuous transition is provided. The gap 23 between the muffler housing 15 and the cylinder 13 continues to the free end of the shorter leg 15b. The muffler 14 is advantageously disposed with respect to the flange 8 of the base body 7 at a distance so as to define a gap through which a portion of the cooling air flows as indicated by arrow 38. The flange 8 defines a wall of the housing of the base body 7.

The end wall 15c of the muffler housing 15 facing toward the air inlet end 16 is provided so that this wall contributes to defining the spiral air channel 24 of the cooling air fan.

In addition to the above-described use as a guide wall for guiding cooling air, the form of the L-shaped muffler housing provides a large muffler volume while having a small size. In this way, a maximum noise attenuation is achieved for a compact chain saw.

The cooling air drawn in by suction via the air inlet 18 flows in the direction of arrow 26 through the gap 23 and around the cylinder 13 and is deflected at the exhaust side in the direction of arrow 27 (FIG. 6) transversely to the primary flow direction 20 at the transition to the shorter leg 15b. With this deflection and the dynamic pressure effected by the leg 15b, an improved cooling of the cylinder 13 also on the rearward side thereof up to the rib base is ensured with the extension of the air-conducting paths wherein heat is accepted. The rearward side of the cylinder is facing away from the primary flow direction 20.

Because of the crowded configuration, the fuel tank 11 built into the U-shaped base body 7 is mounted in close proximity to the head of the cylinder 13 and therefore is subjected to radiant heat.

Figure 4:
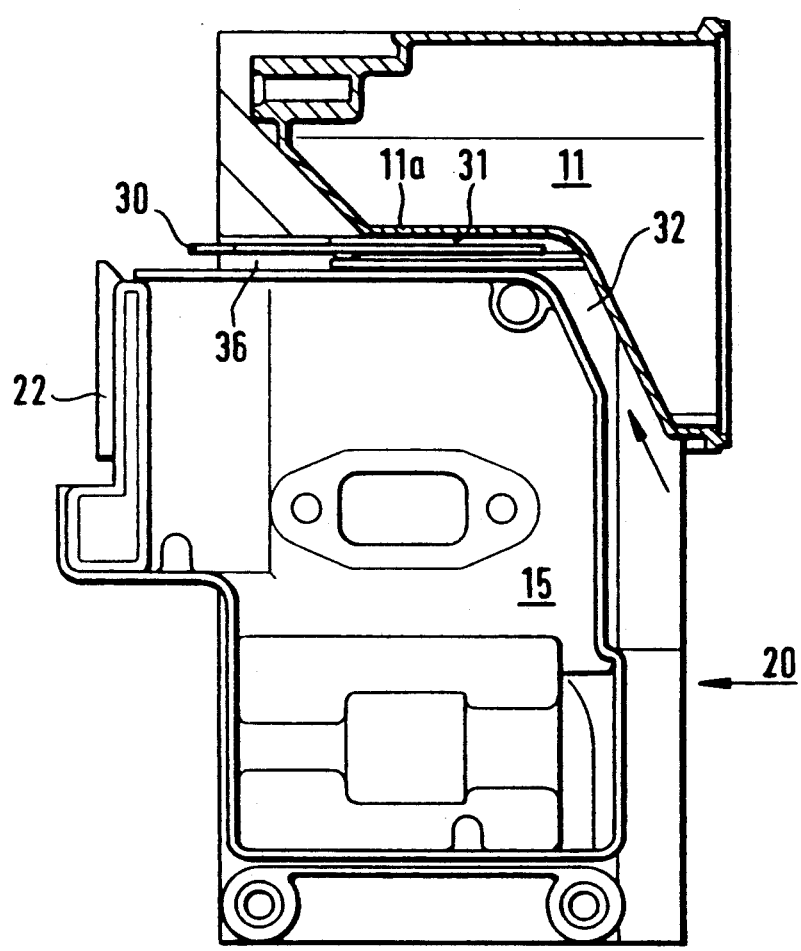
FIG. 4 is a section view taken along line IV—IV of FIG. 2.

Another embodiment of the invention will now be described which can be realized separately from the configuration of the muffler 14. In this embodiment, an air-guide plate 30 is mounted between the cylinder 13 and the tank wall of the fuel tank 11. This air-guide plate 30 is disposed at a spacing (v) to the fuel tank 11 as shown in FIG. 2 and thereby defines a gap 31 with a wall 11a of the tank 11. The gap extends over the entire elevation and depth of the air-guide plate 30. The gap 31 is ventilated by a branched off component air flow which enters through cooling air openings 32 (FIG. 4) provided in the air-guide plate 30. The cooling air openings 32 are disposed at the rim 33 of the air-guide plate 30 facing toward the air inlet 18 and are preferably configured as cutouts open to the edge of the rim 33. In the embodiment shown, several cooling air openings 32 are provided in the direction of the rim 33 and are arranged at a spacing one next to the other. It can be adequate to provide only one opening for the cooling air.

Figure 5:
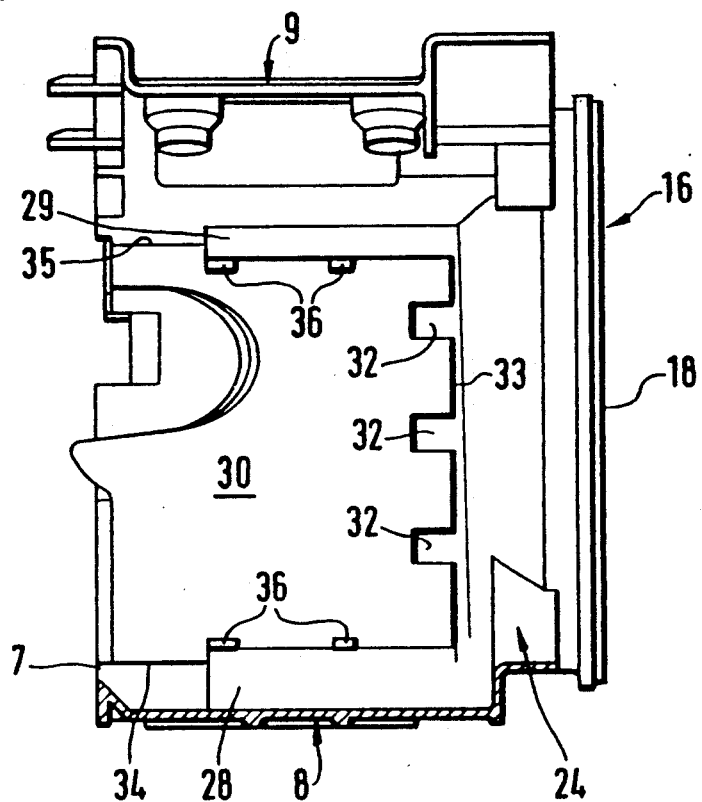
FIG. 5 is a view into the U-shaped housing base body with the view being from the cylinder of the engine; and, FIG. 6 is a plan view of the cylinder head with the exhaust-gas muffler mounted in spaced relationship thereto.

The air-guide plate 30 has a width which corresponds approximately to the width of the fuel tank 11 which extends from the one longitudinal side 16 to the other longitudinal side 17 of the housing 2. The air-guide plate 30 is insertable into mutually opposite guides 28 and 29 in the base body 7 as shown in FIG. 5. The air-guide plate 30 is insertable from the side of the sprocket wheel cover 21 transversely to the longitudinal direction of the housing. The guides 28 and 29 are formed in the base body 7 as a single piece therewith. The rim 34 engaging the guide 28 and the rim 35 engaging the guide 29 have thickened protrusions 36 (see FIGS. 4 and 5) with which the air-guide plate 30 is tightly held in the guides 28 and 29. Two projections 36 are arranged in the longitudinal direction on rims 34 and 35, respectively.

As shown in FIGS. 1 and 2, the air-guide plate 30 extends also between the muffler housing 15 and the wall 11a of the fuel tank 11 in order to achieve a thermal insulation also in this region.

The cooling air flowing in the primary flow direction 20 is deflected by the cylinder 13 and the muffler housing 15 in the direction toward the air-guide plate 30 and a component flow passes through the slits 32 into the gap 31 between the wall 11a of the fuel tank 11 and the air-guide plate 30. Here, the component cooling air flow flows in the direction toward the air outlet. At the same time, a component cooling air flow flows through the gap 36 in order to remove heat. The gap 36 is provided between the air-guide plate 30 and the cylinder 13.

The air-guide plate 30 preferably is made of a cost-effective plastic or an insulating material. It is advantageous to utilize plastic plates laminated or layered with insulating material as the air-guide plate 30.

It is understood that the foregoing description is that of the preferred embodiments of the invention and that various changes and modifications may be made thereto without departing from the spirit and scope of the invention as defined in the appended claims.

What is claimed is:

1. A work apparatus such as a motor-driven chain saw, the work apparatus comprising:
   a housing defining a longitudinal axis;
   said housing having first and second longitudinal sides defining a mounting space therebetween;
   an air-cooled internal combustion engine having a cylinder extending into said mounting space;
   a fuel tank arranged in said housing in close proximity to said cylinder;
   said first longitudinal side defining an air-inlet opening for receiving a flow of cooling air flowing in an air flow direction transversely to said axis for cooling said cylinder;
   said second longitudinal side defining an air-outlet opening for passing the flow of cooling air to the ambient;
   an exhaust gas muffler for receiving exhaust gas from said engine;
   said exhaust gas muffler having a substantially L-shaped housing defining first and second housing legs;
   said first and second housing legs conjointly defining a conducting wall for guiding the flow of cooling air;
   having a first side facing toward said first housing leg and a second side facing toward said second housing leg;
   said first housing leg extending approximately parallel to said air-flow direction; and,
   said second housing leg being arranged transversely to said air-flow direction so as to cause air flowing along said conducting wall to partially back up thereby facilitating an increased transfer of heat from said cylinder to the air.

2. The work apparatus of claim 1, said second housing leg having an exhaust-gas outlet formed therein so as to be disposed in the region of said air-outlet opening.

3. The work apparatus of claim 1, said first and second sides of said cylinder and said first and second housing legs conjointly defining a gap for conducting the cooling air.

4. The work apparatus of claim 1, said cylinder being arranged so as to extend approximately in the direction of said longitudinal axis and said first housing leg being disposed below said cylinder.

5. The work apparatus of claim 1, said fuel tank having a tank wall facing toward said cylinder; said tank wall and said cylinder conjointly defining a space therebetween; said work apparatus further comprising an air-guide plate mounted in said space; and, said air-guide plate and said tank wall conjointly defining an air-conducting gap therebetween for conducting a component of said cooling air therethrough.

6. The work apparatus of claim 5, said air-guide plate having a rim facing toward said air-inlet opening and at least one cooling-air opening formed in said rim.

7. The work apparatus of claim 6, said rim having an outer edge and said cooling-air opening being formed in said air-guide plate as a slot-like opening extending to said outer edge.

8. The work apparatus of claim 5, said air-guide plate having a rim facing toward said air-inlet opening and a plurality of cooling air openings formed in said rim one next to the other; and, each two mutually adjacent ones of said cooling-air openings being spaced a predetermined distance from each other.

9. The work apparatus of claim 5, said housing having guide means formed therein for permitting said air-conducting plate to be laterally insertable into said housing.

10. A work apparatus such as a motor-driven chain saw, the work apparatus comprising:
    a housing defining a longitudinal axis;
    said housing having first and second longitudinal sides defining a mounting space therebetween;
    an air-cooled internal combustion engine having a cylinder extending into said mounting space;
    a fuel tank arranged in said housing in close proximity to said cylinder;
    said first longitudinal side defining an air-inlet opening for receiving a flow of cooling air flowing in an air flow direction transversely to said axis for cooling said cylinder;
    said second longitudinal side defining an air-outlet opening for passing the flow of cooling air to the ambient;
    said fuel tank having a tank wall facing toward said cylinder;
    said tank wall and said cylinder conjointly defining a space therebetween;
    an air-guide plate mounted in said space; and,
    said air-guide plate and said tank wall conjointly defining an air-conducting gap therebetween for conducting the cooling air therethrough.

11. The work apparatus of claim 10, said air-guide plate being disposed in said space so as to be at a predetermined spacing from said tank wall and said cylinder.

12. The work apparatus of claim 11, said air-guide plate being made of plastic.

* * * * *

UNITED STATES PATENT AND TRADEMARK OFFICE
CERTIFICATE OF CORRECTION

PATENT NO.  :  5,199,389
DATED       :  April 6, 1993
INVENTOR(S) :  Günter Wolf and Reinhold Fink It is certified that error appears in the above-identified patent and that said Letters Patent is hereby corrected as shown below:

In column 5, line 46:  before "having", insert -- said cylinder --.

Signed and Sealed this

Seventh Day of December, 1993

*Attest:*

BRUCE LEHMAN

*Attesting Officer*    *Commissioner of Patents and Trademarks*